United States Patent [19]
McBeth

[11] 3,865,938
[45] Feb. 11, 1975

[54] NEMATICIDES
[75] Inventor: Clyde Warren McBeth, Modesto, Calif.
[73] Assignee: Shell Oil Company, Houston, Tex.
[22] Filed: Dec. 26, 1973
[21] Appl. No.: 430,994

Related U.S. Application Data
[63] Continuation-in-part of Ser. No. 329,911, Feb. 5, 1973, abandoned.

[52] U.S. Cl................. 424/219, 424/220, 260/957
[51] Int. Cl............................................. A01n 9/36
[58] Field of Search ............ 424/219, 220; 260/957

[56] References Cited
UNITED STATES PATENTS

| | | | |
|---|---|---|---|
| 2,927,122 | 3/1960 | Schrader | 260/461 |
| 3,454,682 | 7/1969 | Haynes et al. | 260/956 |
| 3,511,632 | 5/1970 | Wallensak et al. | 71/86 |
| 3,538,220 | 11/1970 | Haynes et al. | 424/220 |
| 3,626,036 | 12/1971 | Sirrenberg et al. | 260/957 |
| 3,652,742 | 3/1972 | Sirrenberg et al. | 260/957 |
| 3,720,735 | 3/1973 | Martin et al. | 260/957 |

FOREIGN PATENTS OR APPLICATIONS

| | | |
|---|---|---|
| 744,360 | 2/1960 | Great Britain |
| 747,824 | 4/1956 | Great Britain |
| 1,182,886 | 3/1970 | Great Britain |
| 1,204,447 | 9/1970 | Great Britain |

Primary Examiner—Albert T. Meyers
Assistant Examiner—Douglas W. Robinson

[57] ABSTRACT

Monochlorovinyl-substituted phosphorus compounds of the general formula

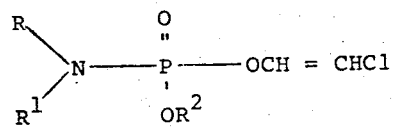

where R and $R^1$ are independently hydrogen or alkyl, and $R^2$ is alkyl are useful as nematicides.

5 Claims, No Drawings

NEMATICIDES

CROSS-REFERENCE TO RELATED APPLICATIONS

This is a continuation-in-part of application Ser. No. 329,911, filed Feb. 5, 1973, now abandoned.

FIELD OF THE INVENTION

This invention relates to the use as nematicides of certain phosphorus compounds. More particularly, the invention relates to the use as nematicides of certain aliphatic monochlorovinyl-substituted phosphorus compounds.

SUMMARY OF THE INVENTION

It has now been found that the aliphatic monochlorovinyl-substituted phosphorus compounds of Formula I

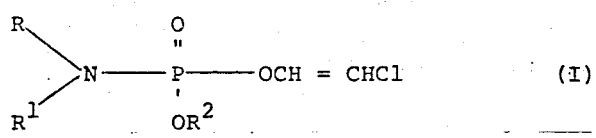

wherein R and $R^1$ are independently hydrogen, methyl, ethyl, isopropyl; and $R^2$ is methyl, ethyl or isopropyl are useful and unexpectedly effective as nematicides. The unique and unexpected utility of the above class of compounds is evident when activity of these compounds is compared to the activity of the corresponding n-propyl- and butyl-substituted derivatives which are inferior nematicides or when compared to the activity of related dichlorovinyl phosphorus compounds which are also inferior nematicides.

Particularly preferred for use as nematicides because of their unexpectedly high levels of activity are those compounds described by Formula I wherein R is methyl, ethyl, or isopropyl, $R^1$ is hydrogen, methyl, ethyl, or isopropyl, and $R^2$ is ethyl or isopropyl. Typical compounds of this subclass include: 2-chlorovinyl ethyl isopropylphosphoramidate and 2-chlorovinyl ethyl diethylphospphoramidate.

The monovinyl-substituted phosphorus compounds of Formula I are readily prepared, using the Perkow reaction and an experimental procedure similar to that disclosed in U.S. Pat. No. 2,956,073 by mixing the corresponding compound of Formula II below with dichloracetahdehyde as in the following reaction:

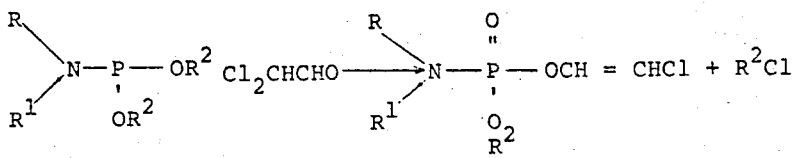

where R, $R^1$ and $R^2$ are as defined above.

The reaction is conveniently carried out at a temperature of from about 0° to about 100° C, preferably from about 40° to about 50° C, for a period of about 1 to about 24 hours. The product is isolated by one of the usual methods used by those skilled in the art, for example, by distillation or by chromatography.

The compound designated as II above can be prepared using the method taught by Kosolapoff in, for example, "Properties and Chemistry of Phosphorus and its Compounds," *Encyclopedia of Chemical Technology*, Volume X, p. 496–501 (1953), by combining a dialkyl chlorophosphite with the appropriate alkylamine according to the following reaction

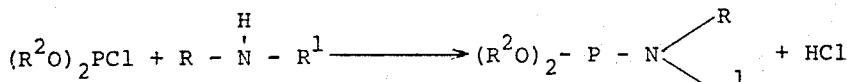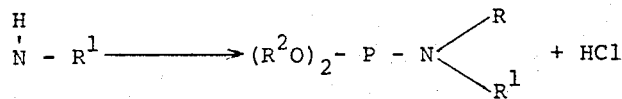

where R, $R^1$ and $R^2$ are as defined above.

The preparation of the compounds of this invention is illustrated in detail in the following examples for the purpose of fully providing the procedure used to obtain the compounds. In the examples below, the structure of the products was confirmed by elemental and infrared analyses.

EXAMPLE 1

Preparation of 2-chlorovinyl ethyl diethylphosphoramidate a. Preparation of diethyl chlorophosphite To 498 grams of triethyl phosphite was added about 10% of 206.3 grams of phosphorus trichloride and, after stirring for 20 minutes, the remaining phosphorus trichloride was added portionwise over a period of 45 minutes at a temperature up to 42°C. The reaction mixture was then heated at 80° to 100° C for 1 hour, allowed to stand overnight, and distilled quickly at 20 Torr at a temperature below 70° C to give 577 grams of clear liquid. This liquid was redistilled at 40 Torr and up to 77° C to give 94.4 grams of liquid. The remainder was distilled through an Oldershaw 20 plate column at a reflux ration of 3:1 to give 372.5 grams of colorless product boiling at 68°–71° C at 32 Torr, representing a 53% yield of diethyl chlorophosphite.

b. Preparation of diethyl diethylphosphoramidite

To a solution of 350 grams diethylamine in 2 liters ether was added a solution of 349 grams diethyl chlorophosphite (prepared as in (a) above and diluted with ether to 500 milliliters) at a temperature of 0°–10° C over a period of 30 minutes. The reaction mixture was stirred for two additional hours and then fitered to remove the amine salt. The solvent was removed from the filtrate to give a liquid which was distilled to give 314.4 grams (76% of the theoretical yield) of colorless diethyl diethylphosphoramidite, boiling at 63° to 70° C at 4Torr.

c. Preparation of 2-chlorovinyl ethyl diethylphosphoramidate

To 314 grams of diethyl diethylphosphoramidite [prepared as in (b) above], 190 grams of dichloroacetaldehyde was added dropwise at a temperature of 40°–50° C over a period of 35 minutes with occasional cooling. The reaction mixture was stirred for an additional hour, then stripped of low boiling material and distilled to give (A) 191.7 grams of a tan liquid boiling at 88°–96° C at 0.1 Torr and having 83.8% purity by gas liquid chromatography (GLC) analysis and (B) 49.6 grams of a tan liquid boiling at 96° C at 0.1 Torr and having 92.1% purity by GLC analysis, representing a 61% total yield of 2-chlorovinyl ethyl diethylphosphoramidate.

EXAMPLE 2

Preparation of 2-chlorovinyl ethyl isopropylphosphoramidate a. To a solution of 300 grams of isopropylamine in 2 liters ether was added dropwise with vigorous stirring over a period of one hour 372.5 grams of diethyl chlorophosphite [prepared as in 1(a) above] at a temperature of −5° to +5° C. After two additional hours during which time the reaction mixture was not cooled, the reaction mixture was filtered to remove the amine salt. The solvent was removed from the filtrate to give 521 grams of a crude product which was distilled to yield (A) 351.8 grams of a product boiling at 52°–58° C at 4 Torr and (B) 46 grams of residue. GLC analysis indicated that (A) was about 97% and (B) was about 70% of the desired 0,0-diethyl isopropylphosphoramidite.

b. To 324 grams of 0,0-diethyl isopropylphosphoramidite [prepared as in (a) above], 205 grams of dichloracetaldehyde was added dropwise over a period of 45 minutes at a temperature of 40° to 45° C with stirring and occasional cooling. The reaction mixture was stirred for an additional hour and then distilled to give 254.5 grams of light tan product boiling at 116°–122° C at 0.4 Torr and having 80% purity by GLC analysis, representing a 63% yield of 2-chlorovinyl ethyl isopropylphosphoramidate.

the harmful effects of nematodes — that is, the unsegmented roundworms of the class Nematoda, also known as eelworms, which customarily inhabit soil and feed upon the roots of plants growing therein.

TABLE I

| | |
|---|---|
| Example 3 | 2-chlorovinyl ethyl dimethylphosphoramidate; boiling point 89–91° at 0.02 Torr. |
| Example 4 | 2-chlorovinyl isopropyl dimethylphosphoramidate; undistilled. |
| Example 5 | 2-chlorovinyl ethyl diisopropylphosphoramidate; boiling point 80–82° at 0.01 Torr. |

EXAMPLE 6

The phosphoramidates of the invention were thoroughly mixed in varying concentrations with soil infested with the root-knot nematode, *Meloidogyne incognita acrita*. Using standard procedures, their efficacy in controlling root-knot nematodes in tomatoes was determined as compared to an untreated control. Two tests were run; one in which the treated soil was planted immediately with the tomato seeds and one in which the soil was held 2 weeks. The dosages used and the per cent control of nematodes obtained at each dosage of each of the test compounds are set out in Table II.

TABLE II – PER CENT CONTROL OF ROOT-KNOT NEMATODES

Compound $$\begin{array}{c} R \\ \phantom{R}\diagdown \\ \phantom{RR}N - \underset{\underset{OR^2}{|}}{\overset{\overset{O}{\|}}{P}} - OCH = CHCl \\ \phantom{R}\diagup \\ R^1 \end{array}$$

| | | | Dosage rate, parts per million ||||||||
|---|---|---|---|---|---|---|---|---|---|---|
| | | | 0-Week Hold Time |||| 2-Week Hold Time ||||
| $R$ | $R^1$ | $R^2$ | 20 | 10 | 5 | 1 | 20 | 10 | .5 | 1 |
| $C_2H_5$ | $C_2H_5$ | $C_2H_5$ | 100 | 100 | 100 | 92 | 100 | 100 | 86 | 86 |
| iso-$C_3H_7$ | H | $C_2H_5$ | 100 | 100 | 100 | 70 | 100 | 93 | 86 | 96 |
| iso-$C_3H_7$ | iso-$C_3H_7$ | $C_2H_5$ | 100 | 100 | 86 | 7 | 96 | 92 | 70 | 0 |
| $C_2H_5$ | H | $C_2H_5$ | 100 | 89 | 86 | 57 | 100 | 92 | 88 | 31 |
| $CH_3$ | $CH_3$ | $C_2H_5$ | 79 | 50 | 70 | 0 | 100 | 100 | 92 | 42 |
| $C_2H_5$ | H | iso-$C_3H_7$ | – | – | 89 | 14 | – | – | 100 | 83 |
| $C_2H_5$ | $C_2H_5$ | iso-$C_3H_7$ | 86 | 50 | 29 | 0 | 100 | 96 | 92 | 17 |

EXAMPLES 3–5

Using the method illustrated in Examples 1 and 2, the compounds listed in Table I were prepared.

The phosphoramidates of this invention have been found to be effective in the protection of plants from For comparison, the results of similar tests for nematicidal activity of related n-propyl- and butyl-substituted phosphoramidate derivatives is set out in Table III. It is evident that even the n-propyl- and butyl-substituted derivatives are significantly less active than the compounds of the present invention.

TABLE III - PER CENT CONTROL OF ROOT-KNOT NEMATODES

Compound

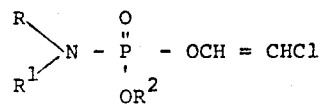

OCH = CHCl         Dosage rate, parts per million

| | | | 0-Week Hold Time | | | | 2-Week Hold Time | | | |
|---|---|---|---|---|---|---|---|---|---|---|
| R | $R^1$ | $R^2$ | 20 | 10 | 5 | 1 | 20 | 10 | 5 | 1 |
| sec-$C_4H_9$ | H | $CH_3$ | - | - | 71 | 0 | - | - | 0 | 0 |
| tert-$C_4H_9$ | H | $C_2H_5$ | 21 | 21 | 0 | 0 | 85 | 85 | 77 | 54 |
| n-$C_4H_9$ | H | $C_2H_5$ | 50 | 14 | 29 | 0 | 77 | 46 | 46 | 46 |
| n-$C_3H_7$ | n-$C_3H_7$ | $C_2H_5$ | 0 | 0 | 0 | 0 | 25 | 8 | 0 | 0 |
| n-$C_3H_7$ | H | iso-$C_3H_7$ | 79 | 43 | 29 | 0 | 96 | 83 | 58 | 50 |
| iso-$C_4H_9$ | H | iso-$C_3H_7$ | 21 | 0 | 0 | 0 | 83 | 67 | 58 | 25 |
| n-$C_4H_9$ | $CH_3$ | iso-$C_3H_7$ | 0 | 0 | 7 | 7 | 50 | 33 | 25 | 0 |

A further comparison of activity can be made against the activity of related dichlorovinyl phosphoramidates. The results of similar tests for nematicidal activity of such compounds is shown in Table IV. Again the related dichlorovinyl phosphoramidates are significantly less active than the monochlorovinyl phosphoramidates of the present invention.

Alternatively, the dry compositions may be formed into granules or pellets by known techniques.

The phosphoramidates may be dispensed in the form of solutions or dispersions in inert organic solvents or in mixtures of inert organic solvents and water. The solvents that may be used in the preparation of these compositions include both polar and non-polar aliphatic and aromatic solvents including, for example benzene, toluene, xylene, naphtha, dimethylformamide, carbon tetrachloride, acetone, methyl ethyl ketone, ethanol, propanol, butanol, dioxane, and mixtures thereof.

TABLE IV - PER CENT CONTROL OF ROOT-KNOT NEMATODES

Compound

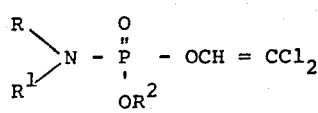

OCH = $CCl_2$         Dosage rate, parts per million

| | | | 0-Week Hold Time | | | | 2-Week Hold Time | | | |
|---|---|---|---|---|---|---|---|---|---|---|
| R | $R^1$ | $R^2$ | 20 | 10 | 5 | 1 | 20 | 10 | 5 | 1 |
| $CH_3$ | $CH_3$ | $C_2H_5$ | 31 | 31 | 8 | 0 | 73 | 73 | 73 | 27 |
| $C_2H_5$ | $C_2H_5$ | $C_2H_5$ | 85 | 54 | 31 | 0 | 91 | 82 | 45 | 0 |

From the results of the tests set forth in Tables II, III and IV, it is apparent that the phosphoramidates of this invention are an effective class of nematicides having superior utility as compared to related classes of phosphoramidates.

The phosphoramidates of this invention may, if desired, be applied as such to the locus to be treated. Ordinarily and preferably, however, these compounds are used in combination with an inert agriculturally acceptable diluent or carrier to make it easier to measure accurately and to apply evenly the small amounts of the nematicide that are required to control nematode activity as well as apply them in a form that will be readily dispersed through the soil. These compounds can be mixed with or deposited upon inert particulate solids, such as fillers earth, talc, diatomaceous earth, natural clay, kaolin, walnut shell flour, and the like, to form dry particular compositions. Such compostions may be employed as dusts, or they may, if desired, be dispersed in water with or without the aid of a surface-active agent.

The method for applying the compositions of this invention comprises applying a phosphoramidate, ordinarily in a composition of one of the aforementioned types, to a locus or area to be protected from nematodes. The active compound, of course, is applied in amounts sufficient to exert the desired action.

The amount of the phosphoramidate to be used in controlling nematodes will naturally depend on the formulation used, the mode of application, the climate, the season of the year, the particular nematode to be controlled, and other variables. Recommendations as to precise amounts are, therefore, not possible. In general, however, application to the locus to be protected of from one to twenty and preferably three to ten pounds per acre of the phosphoramidate of this invention will be satisfactory.

What is claimed is:

1. A method for controlling nematodes which comprises applying to the nematodes a nematicidally effective amount of a compound of the formula

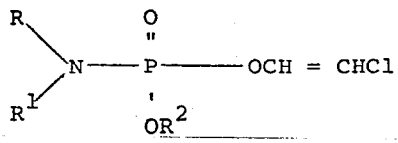

where R and $R^1$ are independently hydrogen, methyl, ethyl or isopropyl, and $R^2$ is methyl, ethyl or isopropyl.

2. A method according to claim 1 wherein R is methyl, ethyl, or isopropyl, $R^1$ is hydrogen, methyl, ethyl, or isopropyl, and $R^2$ is ethyl or isopropyl.

3. A method according to claim 2 where R is ethyl or isopropyl, $R^1$ is hydrogen or ethyl, and $R^2$ is ethyl.

4. A method according to claim 3 where R is ethyl, $R^1$ is ethyl, and $R^2$ is ethyl.

5. A method according to claim 3 where R is isopropyl, $R^1$ is hydrogen, and $R^2$ is ethyl.

* * * * *